Nov. 18, 1924. 1,516,030

E. W. THURLOW

PNEUMATIC TIRE TUBE AND METHOD OF MAKING SAME

Filed March 6, 1922

Inventor:
Edward William Thurlow
By
Attorney.

Patented Nov. 18, 1924.

1,516,030

UNITED STATES PATENT OFFICE.

EDWARD W. THURLOW, OF BRIGHTON, MELBOURNE, VICTORIA, AUSTRALIA, ASSIGNOR OF ONE-HALF TO WILFRID KENT HUGHES, OF MELBOURNE, VICTORIA, AUSTRALIA.

PNEUMATIC-TIRE TUBE AND METHOD OF MAKING SAME.

Application filed March 6, 1922. Serial No. 541,545.

*To all whom it may concern:*

Be it known that I, EDWARD WILLIAM THURLOW, a subject of the King of Great Britain and Ireland, and a resident of the postal district of Middle Brighton, in the city of Brighton, a suburb of the city of Melbourne, in the county of Bourke, State of Victoria, Commonwealth of Australia, have invented a certain new and useful Improved Pneumatic-Tire Tube and Method of Making Same, of which the following is a specification.

This invention relates to an improved nonpuncturable or self sealing tube for pneumatic tires, and to a method of making such tube.

The object of the invention is to provide an extremely strong and efficient self sealing pneumatic tube having one or more internal layers of raw rubber or like self sealing substance and a specially applied reinforcement of canvas, cord cloth, wire mesh or like suitable material which is helically wrapped around the inner portion of the tube containing the self sealing layer or layers. This wrapping of reinforcement is encased in turn in an outer layer of rubber, the whole being vulcanized into an integral homogeneous structure forming a self sealing tube of great strength and capable of being safely used with comparatively old or worn tire covers.

Referring to the drawings which form part of this specification:—

Figure 1:
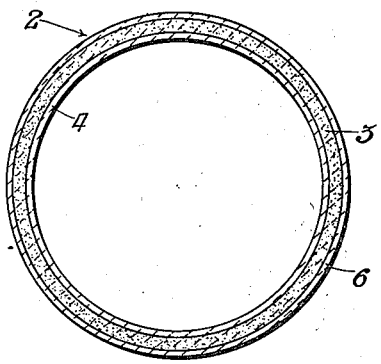
Figure 1 is a cross section showing the inner portion of the improved tube prior to the application of the reinforcement and the outer layer or coat of rubber.

In constructing a tube in accordance with the invention an endless closed tube 2 having in its wall a self sealing layer or layers of raw rubber or like glutinous material 3 as aforesaid is first inflated to a comparatively low pressure, say, about two pounds to the square inch. This tube, which forms the inner portion of the complete structure preferably, but not necessarily, comprises three concentric layers as shown, the intermediate layer 3 being of the self sealing material mentioned whilst the inner and outer layers 4 and 6 are of ordinary rubber. The innermost layer 4 which forms the internal surface of the tube is, however, preferably unvulcanized or only partially vulcanized so that in the event of a nail or other object passing through the wall of the tube the material of this comparatively soft or unvulcanized layer will be forced out by the internal air pressure into the self sealing layer 3 at the point of puncture so as to immediately close the opening which is permanently sealed by the self sealing substance.

Figure 2:
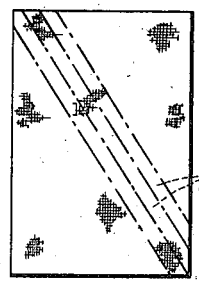
Figure 2 is a diagram illustrating the manner in which the strips of reinforcement are cut from the blank sheet of material diagonally to the selvedge thereof so that the warp and weft strands of the material are disposed diagonally to the length of the strip.
Figure 3:
Figure 3 shows portion of a strip of fabric cut from a blank sheet in the manner above mentioned and illustrating the diagonal disposition of the warp and weft strands.

The exterior of the inflated or partially inflated tube as above mentioned is now wound with a covering of the reinforcement which may consist of canvas, cord cloth, or like fabric, or if desired, a metallic reinforcement, such for instance as wire mesh, or chain mail may be employed for this purpose. Canvas is, however, preferably used and in order to permit of the maximum stretching or extensibility of this reinforcing material it is cut from the blank sheet in strips 7 at an angle to the selvedge as indicated in Figure 2 so that the warp and weft strands of the fabric extend diagonally to the length of the strip as in Figure 3.

Figure 4:
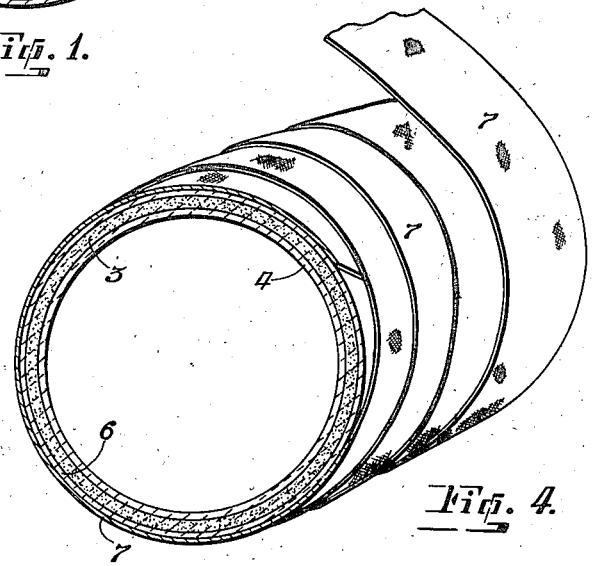
Figure 4 is a perspective view showing the manner in which the reinforcement is wrapped helically upon the inner portion of the tube.
Figure 5:
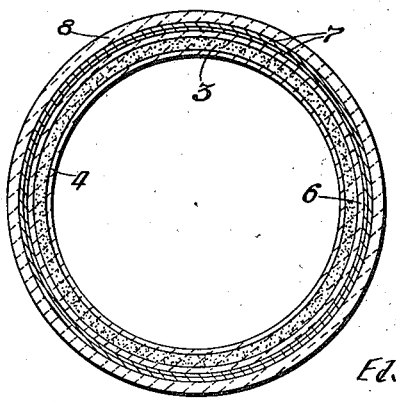
Figure 5 is a cross section of a complete tube constructed in accordance with the invention.

One or more strips of the reinforcing material 7 cut in the above manner are now wrapped helically around the partially inflated self sealing tube as indicated in Figure 4. This helical method of winding is important and serves to further increase the distending or stretching capacity of the reinforcement. Should more than one layer or strip of the reinforcing material be employed, the second and subsequent layers which are also helically wound are preferably so arranged as to overlap the edges of the wrapping beneath. It will be evident however that by merely overlapping the convolutions of a single strip as in Figure 4 a double thickness of the reinforcing material as in Figure 5 may be obtained throughout the tube.

When the reinforcing material has been thus applied it is encased in an outer layer 8 of rubber of suitable thickness and the article is thereupon placed within a circular vulcanizing mould. The tube may now be inflated to any desired pressure so as to force the wall of the tube outwardly against the interior of the mould whereby on the application of heat the tube is vulcanized in the usual manner and the various constituent portions of the tube wall are thus consolidated into a homogeneous integral mass of great strength, and capable of effectively resisting wear, puncture and blow out.

When its manufacture is thus completed the tube may be deflated by means of the usual valve for insertion in the tire cover.

Owing to the fact that the fabric or like reinforcement is embedded within the tube wall either within or adjoining the self sealing material, undue distention of the latter on inflation of the tire is effectively prevented, the self sealing material being actually held in compression by the reinforcement acting against the internal air pressure, so that punctures are immediately sealed up through the contraction of the mastic rubber. At the same time, the manner in which the reinforcement is cut and applied permits of the necessary expansion of the tube as a whole on inflation; the reinforcement also effectively preventing blowout.

By constructing a tube in accordance with the invention it is possible to entirely eliminate valves as the tube may be inflated by inserting a hollow needle or like instrument through its wall and thus pumping up the tire, the hole formed by the instrument being automatically sealed on withdrawal thereof.

It will be further evident that by constructing a tube in the manner described no mandrel or core is necessary within the tube during construction as the air pressure within the inner or self sealing portion 2 of the tube on which the helically wound reinforcement 7 and the outer rubber layer 8 are built up serves the purpose of the usual mandrel. By thus dispensing with the mandrel the cost thereof and the time and labour involved in fitting and removing same are eliminated. In addition, owing to the comparative absence of heat inside the tube consequent on the air contained therein during construction the innermost rubber layer 4 forming the internal surface thereof may remain unvulcanized or only partially vulcanized to increase the self sealing properties of the structure as aforesaid.

A pneumatic tire tube constructed in accordance with the invention is capable of withstanding very high internal pressures besides being highly resilient and not liable to generate excessive heat in running. It is, moreover, proof against puncture and blow out and thus enables old or worn tire covers to be used upon the tube with impunity.

Having now described my invention what I claim as new and desire to secure by Letters Patent is:—

1. As a new article of manufacture, a composite self sealing tube for pneumatic tires comprising in combination an inner tubular portion consisting of a self sealing layer of raw rubber interposed directly between internal and external layers of ordinary rubber, a wrapping of reinforcing material surrounding the external layer of the tube, and an outer layer or coat of rubber surrounding said reinforcement, the whole being vulcanized together and forming an integral structure.

2. As a new article of manufacture, a composite self sealing tube for pneumatic tires, comprising in combination an inner tubular portion containing in its wall a layer of glutinous self sealing material and having its internal surface formed of a layer of unvulcanized or partially vulcanized rubber which adjoins said self sealing material, a wrapping of reinforcing material surrounding said inner portion of the tube, and an outer layer or coat of rubber surrounding said reinforcement, the whole being vlucanized together and forming an integral structure.

3. As a new article of manufacture, a composite self sealing tube for pneumatic tires, comprising in combination an inner tubular portion having a layer or layers of a glutinous self sealing material incorporated wholly within its wall, a strip or strips of reinforcing fabric wrapped helically around the external surface of said inner tubular portion, the warp and weft strands of said fabric extending diagonally to the length of the strip, and an outer layer or coat of rubber surrounding said helical wrapping, the whole being vulcanized together to form an integral structure, substantially as described.

4. The method of constructing a pneumatic tire tube which consists in forming an endless closed tube with a layer or body of a glutinous self sealing substance incorporated wholly within its wall, inflating said tube, helically wrapping a strip or strips of reinforcing material around the inflated tube, placing an outer layer or coat of rubber around the reinforcement, and vulcanizing the whole together to form an integral structure, substantially as described.

5. The method of constructing a pneumatic tire tube which consists in forming an endless closed tube with an intermediate layer of glutinous self sealing material within its wall, partially inflating said tube, cutting a strip of fabric from a blank sheet in such a manner that the warp and weft strands of the fabric extend diagonally to the length of the strip, wrapping said strip helically around the partially inflated tube, applying an outer layer or coat of rubber completely around said helically wound fabric, placing the article thus formed within a circular vulcanizing mould, further inflating the tube within the mould so as to compress the tube wall outwardly against the mould interior, and vulcanizing the inflated article within the mould to form an integral structure, substantially as described.

6. An inner tube for pneumatic tires comprising an unbroken annular inner elastic tubular member, a layer of plastic puncture healing material completely enveloping the entire outer area of said inner tubular member, and a spirally wrapped strip of fabric arranged about the healing material and forming a fabric layer completely enveloping the puncture healing material and constituting a substantially non-extensible closed container therefor, and an outer elastic tubular member enveloping the fabric layer and in direct contact with the entire outer area thereof.

7. A composite self-sealing tube for pneumatic tires, having glutinous self-sealing material incorporated in its wall and a layer of unvulcanized or partially vulcanized rubber adjoining said self-sealing material and forming the internal surface of said wall, and a reinforcing fabric associated with the self-sealing material.

8. A composite self-sealing tube for pneumatic tires, having glutinous self-sealing material incorporated in its wall and a layer of unvulcanized or partially vulcanized rubber adjoining said self-sealing material and forming the internal surface of said wall, and a reinforcing fabric associated with the self-sealing material, the warp and weft strands of said fabric being disposed diagonally of the length of the fabric.

9. A composite self-sealing tube for pneumatic tires, comprising an inner tubular portion containing in its wall a layer of glutinous self-sealing material and having its internal surface formed by a layer of unvulcanized or partially vulcanized rubber which adjoins said self-sealing material, a strip of reinforcing fabric wrapped helically around said inner portion of the tube, the warp and weft strands of said fabric extending diagonally of the length of the strip, and an outer layer of rubber surrounding said helical wrapping, the whole being vulcanized together to form an integral structure.

In testimony whereof I affix my signature.

E. W. THURLOW.

Witness:
 VICTOR J. NELSON.